(12) United States Patent
Porter et al.

(10) Patent No.: US 8,606,634 B2
(45) Date of Patent: Dec. 10, 2013

(54) PROVIDING ADVERTISING IN A VIRTUAL WORLD

(75) Inventors: Erik Porter, Kirkland, WA (US); Tobin R. Titus, Issaquah, WA (US); Ernest A Booth, Bellevue, WA (US); Jeffrey D Carnahan, New York, NY (US)

(73) Assignee: Microsoft Corporation, Redmond, WA (US)

( * ) Notice: Subject to any disclaimer, the term of this patent is extended or adjusted under 35 U.S.C. 154(b) by 1457 days.

(21) Appl. No.: 11/868,967

(22) Filed: Oct. 9, 2007

(65) Prior Publication Data
US 2009/0094106 A1 Apr. 9, 2009

(51) Int. Cl.
*G06Q 30/00* (2012.01)

(52) U.S. Cl.
USPC ............... 705/14.4; 705/14.41; 705/14.42

(58) Field of Classification Search
USPC .......... 705/14.64, 14.56, 1.1, 14.12, 14.49, 705/14.16, 14.4; 715/744, 706, 715, 733; 463/42
See application file for complete search history.

(56) References Cited

U.S. PATENT DOCUMENTS

| | | | |
|---|---|---|---|
| 5,740,388 A | 4/1998 | Hunt | |
| 5,880,731 A | 3/1999 | Liles et al. | |
| 5,977,968 A | 11/1999 | Le Blanc | |
| 6,036,601 A | 3/2000 | Heckel | |
| 6,236,978 B1 | 5/2001 | Tuzhilin | |
| 6,385,592 B1 | 5/2002 | Angles et al. | |
| 6,476,830 B1 | 11/2002 | Farmer et al. | |
| 6,775,581 B2 | 8/2004 | Landers et al. | |
| 6,910,186 B2 | 6/2005 | Kim | |
| 6,954,728 B1 | 10/2005 | Kusumoto et al. | |
| 7,054,928 B2 | 5/2006 | Segan et al. | |
| 7,101,284 B2 | 9/2006 | Kake et al. | |
| 7,168,084 B1 | 1/2007 | Hendricks et al. | |
| 7,212,985 B2 | 5/2007 | Sciuk | |
| 7,249,139 B2 | 7/2007 | Chuah et al. | |
| 7,257,552 B1 | 8/2007 | Franco | |
| 7,421,660 B2 | 9/2008 | Charnock et al. | |
| 7,484,176 B2 | 1/2009 | Blattner et al. | |
| 7,568,004 B2 | 7/2009 | Gottfried | |
| 7,792,801 B2 | 9/2010 | Hamilton et al. | |
| 7,797,168 B2 * | 9/2010 | Kusumoto et al. | ............. 705/1.1 |
| 7,996,264 B2 | 8/2011 | Kusumoto et al. | |
| 8,348,762 B2 | 1/2013 | Willis et al. | |

(Continued)

FOREIGN PATENT DOCUMENTS

| | | |
|---|---|---|
| JP | 14023917 A | 1/2002 |
| KR | 1020010105429 A | 11/2001 |

(Continued)

OTHER PUBLICATIONS

Terdiman, "Meet the Metaverse, your new digital home", News.com, pp. 2.

(Continued)

*Primary Examiner* — Behrang Badii
(74) *Attorney, Agent, or Firm* — Hope Baldauff, LLC

(57) ABSTRACT

Technologies are described herein for providing advertising in a virtual world. An inventory list identifying a plurality of virtual objects is provided. A selection of one or more virtual objects from the inventory is received. An advertisement list identifying a plurality of advertisements is further provided. A selection of one or more advertisements from the advertisement list is further received. The selection of advertisements is placed on the selection of virtual objects in the virtual world.

11 Claims, 5 Drawing Sheets

(56) References Cited

U.S. PATENT DOCUMENTS

| | | | |
|---|---|---|---|
| 8,417,535 | B2 | 4/2013 | Kusumoto et al. |
| 2002/0002509 | A1 | 1/2002 | Wagorn et al. |
| 2002/0007314 | A1 | 1/2002 | Maruyama |
| 2002/0036654 | A1* | 3/2002 | Evans et al. ............... 345/744 |
| 2002/0040332 | A1 | 4/2002 | Maari et al. |
| 2002/0052881 | A1 | 5/2002 | Player |
| 2002/0052913 | A1 | 5/2002 | Yamada et al. |
| 2002/0065746 | A1 | 5/2002 | Lewis |
| 2004/0093266 | A1 | 5/2004 | Dohring |
| 2004/0148221 | A1 | 7/2004 | Chu |
| 2004/0153366 | A1 | 8/2004 | Olson et al. |
| 2004/0248649 | A1 | 12/2004 | Arai et al. |
| 2004/0250210 | A1 | 12/2004 | Huang et al. |
| 2005/0060259 | A1 | 3/2005 | Holmes et al. |
| 2005/0149391 | A1 | 7/2005 | O'Shea |
| 2005/0216346 | A1 | 9/2005 | Kusumoto et al. |
| 2005/0223328 | A1 | 10/2005 | Ashtekar et al. |
| 2005/0251553 | A1 | 11/2005 | Gottfried |
| 2006/0026064 | A1 | 2/2006 | Collins |
| 2006/0100018 | A1 | 5/2006 | Ganz |
| 2006/0111979 | A1 | 5/2006 | Chu |
| 2006/0130095 | A1 | 6/2006 | Willis et al. |
| 2006/0155597 | A1 | 7/2006 | Gleason |
| 2006/0178975 | A1 | 8/2006 | Jung |
| 2006/0212561 | A1 | 9/2006 | Feng |
| 2006/0293958 | A1 | 12/2006 | Koenig |
| 2007/0035548 | A1 | 2/2007 | Jung et al. |
| 2007/0061333 | A1 | 3/2007 | Ramer et al. |
| 2007/0073582 | A1 | 3/2007 | Jung et al. |
| 2007/0087799 | A1 | 4/2007 | Van Luchene |
| 2007/0121843 | A1 | 5/2007 | Atazky et al. |
| 2007/0168863 | A1 | 7/2007 | Blattner et al. |
| 2007/0179867 | A1 | 8/2007 | Glazer et al. |
| 2007/0200846 | A1 | 8/2007 | Nakamura |
| 2007/0203817 | A1 | 8/2007 | Jung et al. |
| 2007/0218987 | A1 | 9/2007 | Van Luchene et al. |
| 2007/0243936 | A1 | 10/2007 | Binenstock et al. |
| 2007/0244750 | A1* | 10/2007 | Grannan et al. ............... 705/14 |
| 2007/0294096 | A1 | 12/2007 | Randall et al. |
| 2008/0059304 | A1* | 3/2008 | Kimsey ............... 705/14 |
| 2008/0163055 | A1 | 7/2008 | Ganz et al. |
| 2008/0163379 | A1 | 7/2008 | Robinson |
| 2008/0204450 | A1 | 8/2008 | Dawson et al. |
| 2008/0208684 | A1 | 8/2008 | Hamilton et al. |
| 2008/0215975 | A1 | 9/2008 | Harrison et al. |
| 2008/0254419 | A1 | 10/2008 | Cohen |
| 2008/0254426 | A1 | 10/2008 | Cohen |
| 2008/0262908 | A1 | 10/2008 | Broady et al. |
| 2008/0263446 | A1 | 10/2008 | Altberg et al. |
| 2009/0019541 | A1 | 1/2009 | Fontjin |
| 2009/0029769 | A1 | 1/2009 | Muller |
| 2009/0089310 | A1 | 4/2009 | Lara et al. |
| 2009/0091565 | A1 | 4/2009 | Booth et al. |
| 2009/0098939 | A1 | 4/2009 | Hamilton et al. |
| 2009/0119173 | A1 | 5/2009 | Parsons et al. |
| 2009/0132361 | A1 | 5/2009 | Titus et al. |
| 2009/0167766 | A1 | 7/2009 | Porter et al. |
| 2009/0192891 | A1 | 7/2009 | Titus et al. |
| 2009/0210301 | A1 | 8/2009 | Porter et al. |
| 2010/0058183 | A1 | 3/2010 | Hamilton et al. |

FOREIGN PATENT DOCUMENTS

| | | |
|---|---|---|
| KR | 100614899 B1 | 8/2006 |
| WO | WO 01/24083 | 4/2001 |
| WO | WO 2004/053799 | 6/2004 |

OTHER PUBLICATIONS

Dibbell "The Life of the Chinese Gold Farmer", Jun. 17, 2007, New York Times, pp. 1-9.

"The iBM Innovate Quick internal metaverse project", 2007, pp. 1-8.

International Search Report dated Jun. 17, 2009 in International Application No. PCT/US2008/087879.

Benkoil, "Will Google's Virtual World Plans Change Virtual Ad Economics?", Oct. 16, 2007, JackMyers.com, pp. 1-2.

Keeves, "Real or Virtual? Play the intersection, and build communities!" Mar. 24, 2007, IBC Solutions—Future Thinking, 1 page.

Poppe, S., "What's the idea?", Sep. 28, 2007, retrieved Oct. 25, 2007 at http://spoppe.livejournal.com/tag/advertising, pp. 1-13.

Tarumi, et al., "Communication through Virtual Active Objects Overlaid onto the Real World", Sep. 2000, Proceedings of the Third International Conference on Collaborative Virtual Environments (CVE 2000), ACM, pp. 155-164.

Whang, et al., "Lifestyles of Virtual World Residents, Living in the on-line game, 'Lineage'", Dec. 3-5, 2003, Proceedings of 2003 International Conference on Cyberworlds (CW'03), pp. 18-25.

Woywood, T., "Advertising, Branding & Marketing in Social Virtual Worlds", 2006, www.newton21,com, pp. 39-42.

Vedrashko, I., "Advertising in Computer Games", Sep. 2006, www.GamesBrandsPlay.com, 80 pages.

"Branding your Business with Avatars", retrieved Oct. 25, 2007, at http://www.pigandpanda.com/ebay-education/avatars.htm, Pig and Panda, pp. 1-3.

"The Buzz on . . . MMOGs and in-game advertising", retrieved Oct. 25, 2007, at www.iabuk.net/media/images/Thebuzzontheinternetsimpactongaming_1101.doc, Internet Advertising Bureau, pp. 1-13.

"Is this avatar attribute query issue I am thinking of valid?", Dec. 6, 2006, retrieved Oct. 25, 2007, at http://forums.activeworlds.com/showthread.php?p=39288, pp. 1-3.

"Marketing to Avatars", retrieved Oct. 25, 2007 at http://www.virtuallinks.net/?p=8, pp. 1-4.

"Second Life: Migration to Virtual Worlds and the Use of Time", Oct. 19, 2007, retrieved Oct. 26, 2007 at http://dusanwriter.wordpress.com/2007/10/19/second-life-migration-to-virtual-worlds-and-the-use-of-time/, 4 pages.

U.S. Official Action dated Aug. 5, 2010 in U.S. Appl. No. 11/943,610.

U.S. Official Action dated Oct. 8, 2010 in U.S. Appl. No. 11/868,972.

U.S. Official Action dated Jan. 24, 2011 in U.S. Appl. No. 11/943,610.

U.S. Official Action dated Jan. 25, 2011 in U.S. Appl. No. 11/965,732.

U.S. Official Action dated Nov. 17, 2010 in U.S. Appl. No. 12/022,122.

U.S. Official Action dated Dec. 8, 2010 in U.S. Appl. No. 12/031,683.

Terdiman, "Meet the Metaverse, Your New Digital Home", Apr. 16, 2007, CNET Networks, pp. 1-2.

U.S. Official Action dated Aug. 31, 2012 in U.S. Appl. No. 11/965,732.

U.S. Official Action dated Jul. 9, 20012 in U.S. Appl. No. 12/022,122.

"Replace" and "Transaction" Merriam-Webster, Incorporation, Merriam-Webster's Collegiate Dictionary, tenth Edition (1998) pp. 992, 1252.

U.S. Official Action dated May 10, 2013 in U.S. Appl. No. 11/943,610.

U.S. Notice of Allowance dated Apr. 26, 2013 in U.S. Appl. No. 11/965,732.

U.S. Official Action dated Mar. 13, 2013 in U.S. Appl. No. 12/022,122.

U.S. Official Action dated Jul. 14, 2011 in U.S. Appl. No. 11/868,972.

U.S. Official Action dated Jul. 21, 2011 in U.S. Appl. No. 11/965,732.

U.S. Official Action dated Apr. 28, 2011 in U.S. Appl. No. 12/022,122.

U.S. Official Action dated Aug. 9, 2011 in U.S. Appl. No. 12/031,683.

U.S. Notice of Allowance dated Aug. 2, 2013 in U.S. Appl. No. 11/868,972.

U.S. Official Action dated Aug. 30, 2013 in U.S. Appl. No. 12/022,122.

* cited by examiner

PROVIDING ADVERTISING IN A VIRTUAL WORLD

BACKGROUND

In recent years, massively multiplayer online ("MMO") computer applications, such as massively multiplayer online role-playing games ("MMORPGs"), have become extremely popular not only with serious gamers, but also with casual gamers and other Internet users. One example of a MMO computer application enables a participant to create and develop a fictional character in a virtual world. The fictional character is usually associated with an avatar or some other visual representation that enables other participants to recognize the particular fictional character. A given participant may develop, among other things, a storyline, a reputation, and attributes of her fictional character by interacting in the virtual world via the fictional character. Other examples of MMO computer applications may not involve the creation of a virtual world representation of the participant.

The virtual world typically includes an environment with a variety of virtual locations containing a variety of virtual objects. In some cases, the virtual locations and the virtual objects mimic realistic locations and objects, while in other cases, the virtual locations and virtual objects are fanciful creations. MMO computer applications generally permit the fictional character to travel across the virtual locations and interact with the virtual objects and other fictional characters.

Advertising in the modern age has proven to be increasingly challenging. In particular, conventional advertising techniques have become less effective especially in recent times. Consumers are now provided with substantially more entertainment options than just a few years ago, thereby reducing the number of consumers that are exposed to a given advertisement. Further, new technologies, such as portable music players, satellite radio, and digital video recorders ("DVRs"), have allowed the users to avoid or skip conventional advertisements entirely.

As advertisers try to find ways to reach more consumers, one advertising medium that has become more attractive are virtual worlds, like MMO computer applications. The number of participants in MMO computer applications has steadily increased in recent times, and this trend shows little, if any, signs of reversing. Further, MMO computer applications provide a single entertainment destination for many Internet users and gamers, thereby enabling advertisers to reach a larger number of consumers through a single advertising medium. As computer and Internet technologies continue to improve to provide more and better ways to include real-world advertisements within the virtual world, MMO computer applications will continue to grow as a significant advertising medium.

It is with respect to these considerations and others that the disclosure made herein is presented.

SUMMARY

Technologies are described herein for providing advertising in a virtual world. In particular, through the utilization of the technologies and concepts presented herein, an interface may be provided that enables an advertiser, for example, to upload advertisements, to retrieve listings of advertisements and available virtual objects in the virtual world, and to select advertisements and virtual objects from the listings. This interface provides advertisers and other users the ability to easily advertise in the virtual world.

According to one aspect presented herein, a computer program provides an inventory list that identifies available virtual objects in a virtual world. The program further provides an advertisement list that identifies advertisements uploaded by a particular advertiser. The advertiser, with access to the program, can select one or more virtual objects from the inventory, as well as one or more advertisements from the advertisement list. After receiving the advertiser's selections, the program places the selected advertisements on the selected virtual objects in the virtual world.

It should be appreciated that although the features presented herein are described in the context of a MMO computer application, these features may be utilized with any type of virtual world or environment including, but not limited to, other types of games as well as online social communities. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
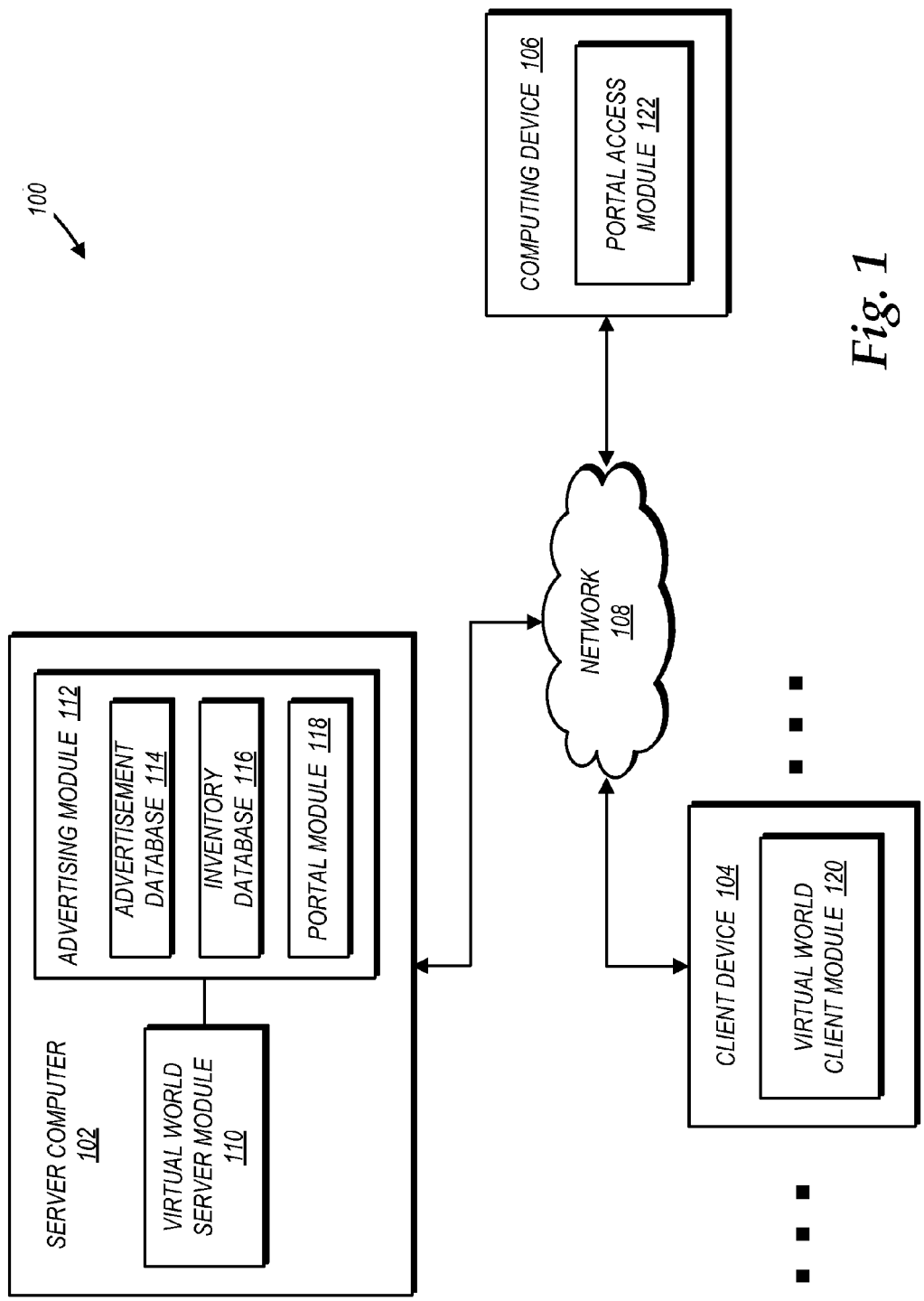
FIG. 1 is a network architecture diagram showing aspects of a network architecture capable of implementing a virtual world, such as a massively multiplayer online role-playing game.

The following detailed description is directed to technologies for providing advertising on virtual objects located in a virtual world. Through the utilization of the technologies and concepts presented herein, an advertiser, for example, is provided with an inventory list identifying available virtual objects and an advertisement list identifying advertisements that can be placed on the virtual objects. The inventory list may further identify participants to whom selected advertisements may be directed via the virtual objects. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As used herein, the term virtual world refers to a computer-implemented environment, which may include simulated, lifelike environments as well as fanciful, non-existing environments. Exemplary virtual worlds may include any massively multiplayer online ("MMO") computer application including, but not limited to, massively multiplayer online role-playing games ("MMORPGs"), virtual social communities, and virtual reality computer applications. In one embodiment, the MMO computer application simulates a real world environment. For example, the virtual world may be defined by a number of rules, such as the presence of gravity or the lack thereof. In other embodiments, the MMO computer application includes a fanciful environment that does not simulate a real world environment.

The virtual world may be inhabited by avatars, which are virtual or symbolic representations of real world participants (hereinafter referred to as participants). As such, each avatar is typically associated with and controlled by a particular participant. Avatars may include two-dimensional and/or three-dimensional images. Through the virtual world, the avatars may interact with other avatars, as well as with virtual objects. Virtual objects may include virtual representations of real world objects, such as houses, cars, billboards, clothes, and soda cans, as well as fanciful creations, such as a teleportation machine or a flying car. According to exemplary embodiments, one or more virtual objects and one or more avatars in the virtual world are capable of providing an advertisement. The avatars and the virtual objects utilized in the virtual world may or may not be animated images.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing advertising in a virtual world will be described. In particular, FIG. 1 illustrates a simplified network architecture 100 for implementing a virtual world. The network architecture 100 shown in FIG. 1 includes a server computer 102, a client device 104, and a computing device 106, all of which are operatively coupled via a network 108. The network 108 may be any suitable network, such as a local area network ("LAN") or the Internet. Although only one client device 104 and one computing device 106 are illustrated in FIG. 1, the network architecture 100 may include multiple client devices and multiple computing devices in any suitable network configuration.

The client device 104 may be any suitable processor-based device, such as a computer or a gaming device. Exemplary gaming devices include the XBOX and the XBOX 360 from MICROSOFT CORPORATION, the WII from NINTENDO COMPANY, LIMITED, and the PLAYSTATION 3 and the PSP from SONY CORPORATION. Although not so illustrated in FIG. 1, the client device 104 may be coupled to any suitable peripheral devices to enable the participant to experience and interact with the virtual world. Exemplary peripheral devices may include an input device, such as a keyboard, a mouse, a microphone, and a game controller, and an output device, such as a display and speakers. Some peripheral devices may even provide both input and output functionality. For example, a game controller may provide vibration feedback.

As shown in FIG. 1, the client device 104 includes a virtual world client module 120, which interacts with the virtual world server module 110 executing on the server computer 102. In particular, the virtual world client module 120 may receive and process data from virtual world server module 110 and output the data to output devices coupled to the client device 104. Further, the virtual world client module 120 may receive data from input devices coupled to the client device 104 and transmit the data to the virtual world server module 110.

The virtual world client module 120 may include any suitable component for accessing the virtual world server module 110. In one example, the virtual world client module 120 may be a computer application configured to locally provide at least a portion of the virtual world for the client device 104. In this way, the amount of data retrieved from the server computer 102 by the client device 104 to generate the virtual world may be reduced. In another example, the virtual world client module 120 may be a web browser configured to retrieve the virtual world from the virtual world server module 110. Since many public computers, such as those found in Internet cafes, commonly have a web browser installed and prohibit the installation of new computer applications, providing participants a way to access the virtual world via the web browser may provide greater accessibility and convenience.

As shown in FIG. 1, the server computer 102 includes a virtual world server module 110 and an advertising module 112. The virtual world server module 110 generally administers the virtual world and serves as a conduit between multiple client devices, including the client device 104. The advertising module 112 generally enables an advertiser or other user to distribute advertising within the virtual world. The advertising module 112 may include an advertisement database 114, an inventory database 116, and a portal module 118, as illustrated in FIG. 1. The advertisement database 114 may store one or more advertisements. As described in greater detail below with respect to FIG. 3, an advertiser or other user may upload advertisements into the advertisement database 114 and associate each uploaded advertisement with a category. For example, the advertiser may associate each uploaded advertisement with its form. Exemplary forms of advertisement include text, picture, audio, and video. The inventory database 116 may store any suitable information related to the availability of virtual objects in the virtual world for advertising. For example, the inventory database 116 may store information indicating the locations of virtual objects, the availability of virtual objects to provide an advertisement, the forms of advertisement that the virtual objects are capable of providing, and any associations between particular advertisements and each unique participant or group of participants.

Although not so limited, embodiments described herein refer to an advertiser or other user accessing the advertisement database 114 via the portal module 118. In another embodiment, a participant accesses the advertisement database 114 via the virtual world client module 120. In this case, the participant may access the advertisement database 114 to select one or more advertisements to place on virtual objects owned by the participant. To encourage participants to place advertisements on their virtual objects, the advertisers corresponding to the selected advertisements may provide any suitable form of remuneration including, but not limited to, real world currency, virtual currency, real world objects, and virtual objects. In yet another embodiment, a participant serves as an representative representing other participants as clients. In this case, the representative participant may select one or more advertisements to place on virtual objects owned by the client participants. Similar to the above, the advertisers corresponding to the selected advertisements may provide any suitable form of remuneration to each of the client participants.

In one embodiment, the portal module 118 provides a website or other remote interface that enables an advertiser to access the advertisement database 114 and the inventory database 116 via the network 108. In particular, the advertiser may utilize the computing device 106 to access the portal module 118. The computing device may include a portal access module 122 that enables communication with the portal module 118 via the network 108, as illustrated in FIG. 1. In one embodiment, the portal access module 122 is a web browser. As described in greater detail below with respect to FIG. 3, the website provided by the portal module 118 provides functionality that allows an advertiser to retrieve a list of available inventory (referred herein as an inventory list) from the inventory database 116, upload advertisements into the advertisement database 114, and retrieve a list of uploaded advertisements (referred herein as an advertisement list) from the advertisement database 114. The inventory contained in the inventory list may include any suitable inventory stored in the inventory database 116 including, but not limited to, virtual objects and participants.

The advertiser may also select one or more virtual objects from an inventory list, one or more participants from the inventory list, and one or more advertisements from an advertisement list. In response to receiving the advertiser's selections, the advertising module 112 places the selected advertisements onto the selected virtual objects in the virtual world. In this way, the participants, by utilizing their corresponding avatars, can view the advertisements in the virtual world. The particular advertisement viewed on the virtual objects may depend on the particular participant viewing the virtual objects. That is, one participant may view one advertisement on a virtual object, and another participant may view an entirely different advertisement on the virtual object, even if both participants view the virtual object at the same time. Further, the advertising module 112 may be configured to accept payment from the advertisers, thereby providing a single transaction point at which to select, purchase, and distribute advertising in the virtual world. Additional details regarding the inventory list and the advertisement list are provided below with respect to FIG. 3.

When a participant desires to access the virtual world, the participant may initiate the virtual world client module 120 to establish a session with the virtual world server module 110 via the network 108. During the session, the virtual world server module 110 may transmit data (e.g., environment layouts, avatar movements of other participants) associated with the virtual world to the virtual world client module 120. Similarly, the virtual world client module 120 may transmit data from associated input devices to the virtual world server module 110. The virtual world client module 120 may further interact with the advertising module 112 to provide advertisements in the virtual world. Alternatively, the virtual world server module 110 may act as a conduit between the virtual world client module 120 and the advertising module 112 such that virtual world client module 120 and the advertising module 112 need not directly communicate.

Figure 2:
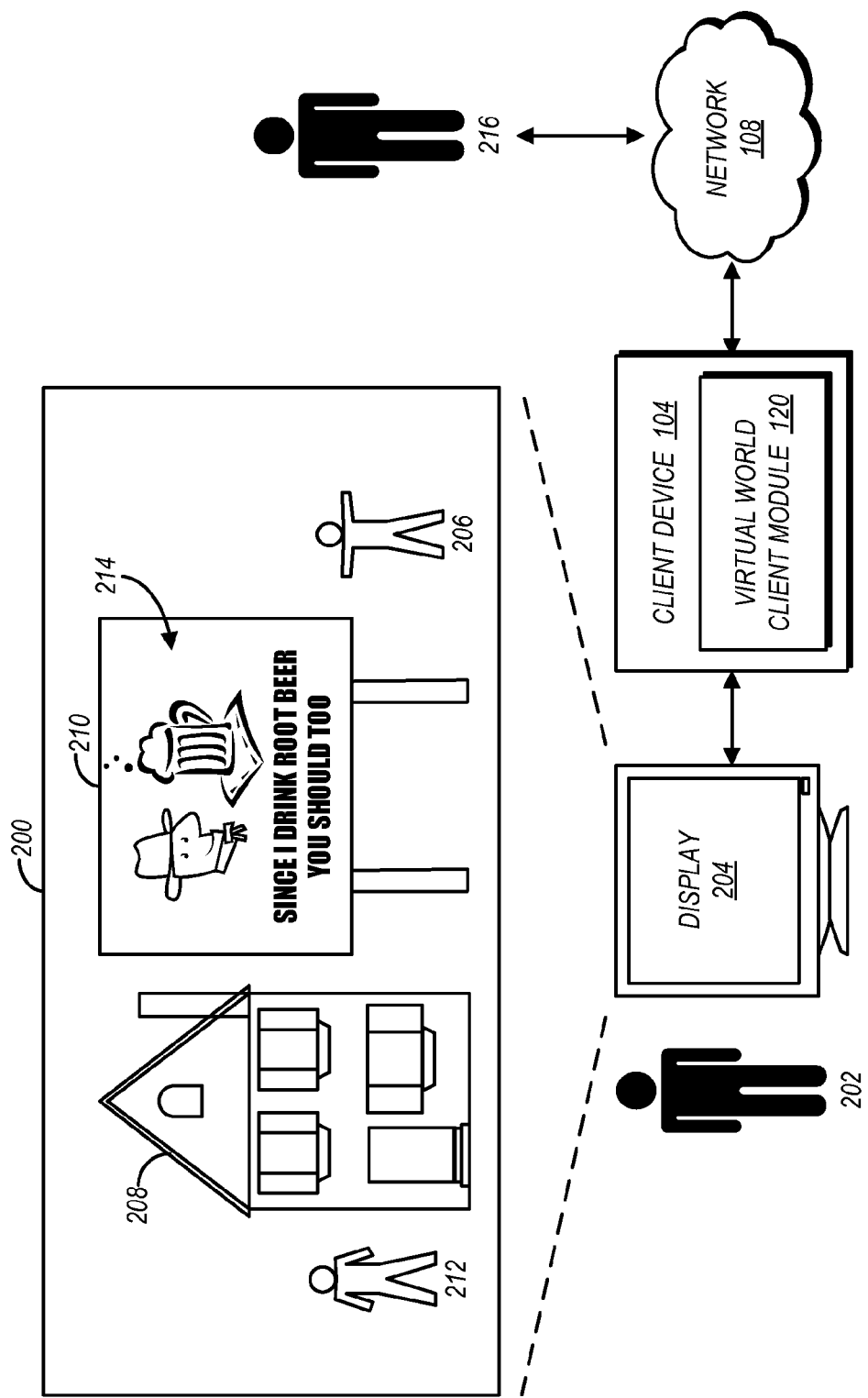
FIG. 2 is a screen display diagram showing an illustrative screenshot of a virtual world including an advertisement on a virtual object, in accordance with one embodiment.

Turning now to FIG. 2, an illustrative screenshot 200 of a virtual world provided by the virtual world server module 110 and the virtual world client module 120 is shown, in accordance with one embodiment. A first participant 202 may view the screenshot 200 on a display 204 operatively coupled to the client device 104. As shown in FIG. 2, the screenshot 200 illustrates a first avatar 206 and a second avatar 212. The first avatar 206 is a fictional representation of the first participant 202 in the virtual world. In one embodiment, the first participant 202 controls the movement of the first avatar 206 within the virtual world via an input device (not shown), such a keyboard, mouse, and game controller, operatively coupled to the client device 104. The first participant 202 may utilize the first avatar 206 to interact with other avatars, such as the second avatar 212, in the virtual world. The second avatar 212 may be the fictional representation of a second participant 216 associated with another client device (not shown) at a remote location.

The screenshot 200 further includes two virtual objects: a house 208 and a billboard 210. In this example, the second avatar 212 owns the house 208 and the billboard 210. Placed onto the billboard 210 is a root beer advertisement 214. In one embodiment, the second participant 216, by virtue of controlling the second avatar 212, receives income from an advertiser for leasing the space on the billboard 210 for the root beer advertisement 214. As illustrated in FIG. 2, the first avatar 206 has moved next to the billboard 210. The first participant 202 can generally view the surroundings of the first avatar 206, as illustrated in the screenshot 200. As such, the first participant 202 can view the billboard 210 and the associated root beer advertisement 214.

It should be appreciated that the screenshot 200 is only illustrative. In other embodiments, an advertisement, such as the root beer advertisement 214, may be placed on any suitable virtual object in the virtual world including, but not limited to, houses, cars, clothes, and signs. It should further be appreciated that the placed advertisement may be presented in any suitable multimedia format, such as text, picture, audio, video, and combinations thereof. Additionally, while the first participant 202 views the root beer advertisement 214 when viewing the billboard 210 at a given instance, another participant (not shown) may view another advertisement (not shown) when viewing the billboard 210 at the same instance. The embodiments presented herein allow advertisers to easily identify virtual objects, such as the billboard 210, on which advertising may be placed and to have advertisements placed thereon. The embodiments presented herein further allow advertisers to select which advertisements are placed on the virtual objects depending on the unique participant or group of participants viewing the virtual objects. Additional details regarding this process are provided below with respect to FIGS. 3-4.

Figure 3:
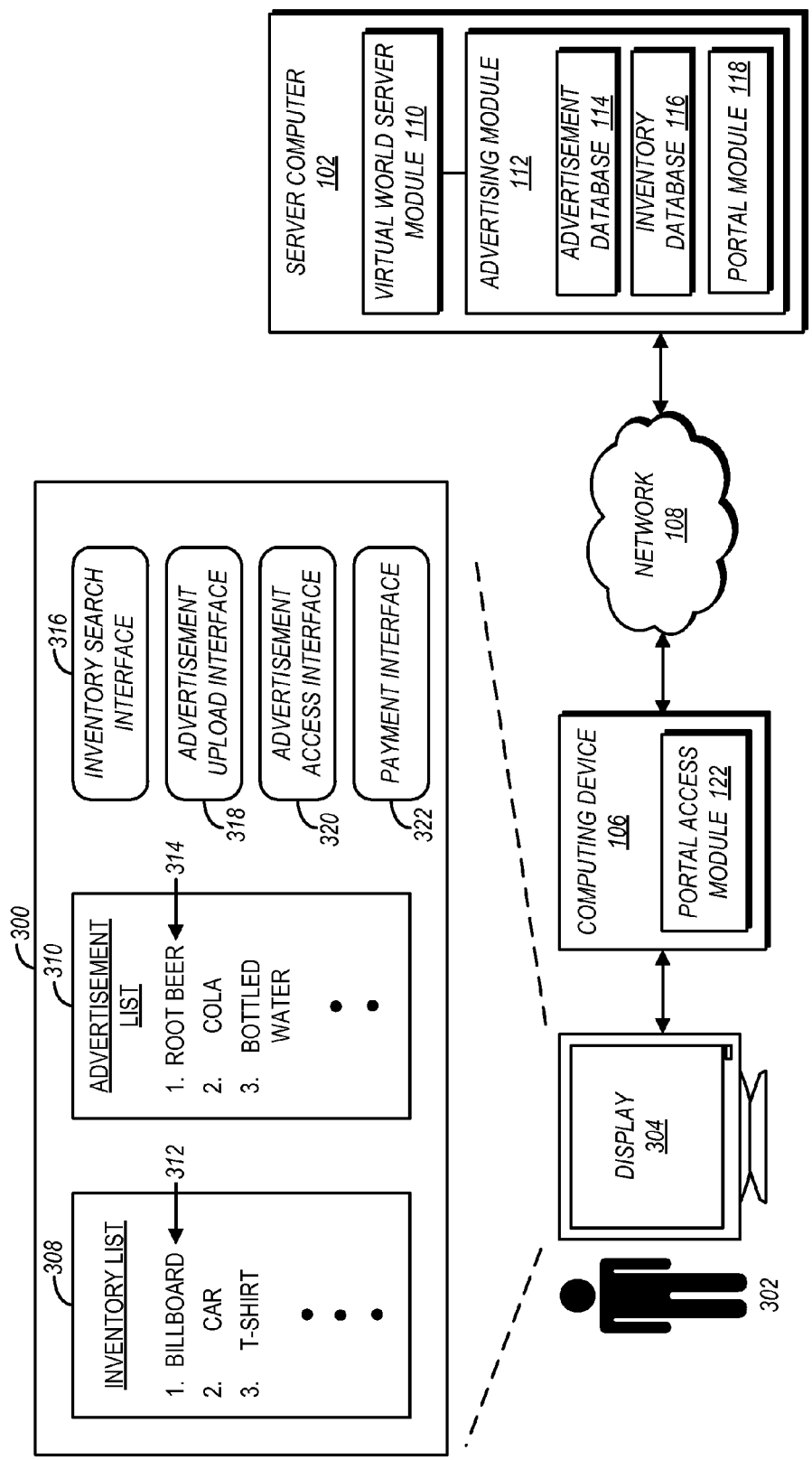
FIG. 3 is a screen display diagram showing an illustrative screenshot of an advertising interface including an inventory list, an advertisement list, an inventory search interface, an advertisement search interface, and a payment interface, in accordance with one embodiment.

Turning now to FIG. 3, an illustrative screenshot 300 of an advertising interface provided by the portal module 118 is shown, in accordance with one embodiment. As previously mentioned, the advertising interface provided by the portal module 118 may be a website, according to one embodiment. An advertiser 302 may view the screenshot 300 on a display 304 operatively coupled to a computing device 106. The computing device 106 may be a desktop computer, a laptop computer, or other suitable processor-based device. The computing device 106 includes a portal access module 122, which may be a web browser, according to one embodiment. The advertiser 302 may utilize the portal access module 122 to remotely access the portal module 118 via the network 108.

The portal module 118 provides the advertiser 302 with access to an inventory list 308 retrieved from the inventory database 116 and an advertisement list 310 retrieved from the advertisement database 114. In one embodiment, the inventory list 308 and the advertisement list 310 are presented as a graphical user interface ("GUI") that enables the advertiser 302 to select virtual objects from the inventory list 308 and advertisements from the advertisement list 310.

Although not so limited, as shown in FIG. 3, the inventory list 308 provides a list of available virtual objects capable of providing an advertisement from the advertisement list 310. For example, the inventory list 308 provides a virtual object item 312 corresponding to the billboard 210. It should be appreciated that the inventory list 308 may be populated with any suitable information retrieved from the inventory database 116. For example, the inventory list 308 may also be populated with a list of participants to whom advertisements selected from the advertisement list 310 may be directed via virtual objects selected from the inventory list 308. Further, although not so illustrated in FIG. 3, the virtual objects listed in the inventory list 308 may be organized and shown by category, such as the location of the virtual objects, for more convenient viewing and selection. As previously mentioned, the inventory database 116 may store any suitable information regarding the virtual objects in the virtual world, such as the locations of virtual objects, the availability of virtual objects to provide an advertisement, and the forms of advertisement that the virtual objects are capable of providing.

In one embodiment, the advertiser 302 can retrieve the inventory list 308 by accessing an inventory search interface 316. The inventory search interface 316 may be a search box, a pre-populated list, or other suitable interface. The inventory search interface 316 may enable the advertiser 302 to specify a criterion associated with the virtual objects the advertiser 302 desires to retrieve. For example, the advertiser 302 may want to retrieve virtual objects located in a particular virtual town in the virtual world. If the advertiser 302 inputs the virtual town into the inventory search interface 316, the portal module 118 may provide an inventory list identifying all of the virtual objects located in that virtual town. The inventory search interface 316 may further enable the advertiser 302 to specify another criterion associated with participants to whom the advertiser 302 desires to direct advertisements. One way to group participants is by a property associated with each of the participants. Exemplary properties include, but are not limited to, age, gender, ethnicity, income, geographic location, hobbies, preferences, and the like.

As shown in FIG. 3, the advertisement list 310 provides a list of advertisements that can be placed on virtual objects in the virtual world. For example, the advertisement list 310 provides an advertisement item 314 corresponding to the root beer advertisement 214 illustrated on the billboard 210. The advertisement list 310 may be limited to the advertisements uploaded by the advertiser 302. Further, although not so illustrated in FIG. 3, the advertisements listed in the advertisement list 310 may be organized and shown by category, such as the form of advertisement, for more convenient viewing and selection. In one embodiment, the advertiser 302 uploads advertisements into the advertisement database 114 by accessing an advertisement upload interface 318. The uploaded advertisements may be stored in the advertisement database 114 for later use by the advertiser 302. The advertiser 302 may associate each uploaded advertisement with any suitable category. For example, the advertisements may associate each uploaded advertisement with its corresponding form, such as text, picture, audio, and video.

In one embodiment, the advertiser 302 can retrieve the advertisement list 310 by accessing an advertisement access interface 320. The advertisement access interface 320 may utilize an authentication procedure, such as a login and password, to verify that the user accessing the advertisement access interface 320 is the advertiser 302. After completing the authentication, the portal module 118 may display the advertisement list 310 identifying advertisements uploaded by the advertiser 302.

In one example, the advertiser 302 may select the virtual object item 312 that corresponds to the billboard 210 and the advertisement item 314 that corresponds to the root beer advertisement 214. The portal module 118 may instruct the virtual world server module 110 to place the root beer advertisement 214 on the billboard 210, as illustrated in FIG. 2. The advertiser 302 may also render payment for the selections via a payment interface 322. The payment interface 322 may permit any suitable payment method including, but not limited to, credit card payment or a barter/trade arrangement. It should be appreciated that the portal module 118 may instruct the virtual world server module 110 to place the root beer advertisement 214 on the billboard 210 before, during, or, after payment is made via the payment interface 322.

In one embodiment, the inventory list 308 and the advertisement list 310 are conditioned upon each other. For example, if the billboard 210 corresponding to the virtual object item 312 is selected from the inventory list 308, the advertisements not suitable for placement on the billboard 210 may automatically be removed from the advertisement list 310 before the advertiser 302 selects an advertisement. Thus, if the billboard 210 is not capable of displaying video, then video-based advertisements may be removed from the advertisement list 310. Similarly, if the root beer advertisement 214 corresponding to the advertisement item 314 is selected from the advertisement list 310, the virtual objects that are not capable of providing the root beer advertisement 214 may be removed from the inventory list 308 before the advertiser 302 selects a virtual object.

It should be appreciated that the screenshot 300 is only illustrative. In other embodiments, the advertiser 302 may select any number of virtual objects from the inventory list 308 and any number of advertisements from the advertisement list 310. For example, the advertiser 302 may select categories of virtual objects and advertisements. That is, instead of selecting only the billboard 210 corresponding to the virtual object item 312, the advertiser 302 may select a geographic area where the billboard 210 is located. Similarly, instead of selecting only the root beer advertisement 214 corresponding to the advertisement item 314, the advertiser 302 may select the form of the root beer advertisement 214. In this way, the advertiser 302 can easily select multiple advertisements and multiple virtual objects. Given selection of multiple advertisements and/or multiple virtual objects, the portal module 118 may instruct the virtual world server module 110 to place the selected advertisements on the selected virtual objects.

In a further embodiment, multiple advertisements from the advertisement list 310 may be selected to be placed on the same virtual object, such as the billboard 210. Each of the multiple advertisements selected may be associated with a unique participant or group of participants. For example, the root beer advertisement 214 may be associated with the first participant 202, and another advertisement, such as a cola advertisement (not shown), may be associated with a third participant (not shown). In this example, the advertiser 302 is able to simultaneously provide the root beer advertisement 214 to the first participant 202 and provide the cola advertisement to the third participant using the same virtual object, the billboard 210. That is, when the first participant 202 views the billboard 210 at a given time, the first participant 202 views the root beer advertisement 214. In contrast, when the third participant views the billboard 210 at the same time, the third participant views the cola advertisement.

To enable the advertiser 302 to select multiple advertisements, the inventory search interface 316 may include additional functionality that enables the advertiser 302 to also search for participants based on one or more properties associated with the participants. For example, the advertiser 302 may search for female participants in high income households participating in the virtual world from the New York City metro area during primetime hours. In this way, the inventory search interface 316 enables the advertiser 302 to not only search for the advertisements and the virtual objects on which the advertisements are placed, but to also search for the participants to whom particular advertisements may be directed. After retrieving the list of participants, the advertiser 302 may associate particular participants to particular advertisements and/or particular virtual objects.

Figure 4:
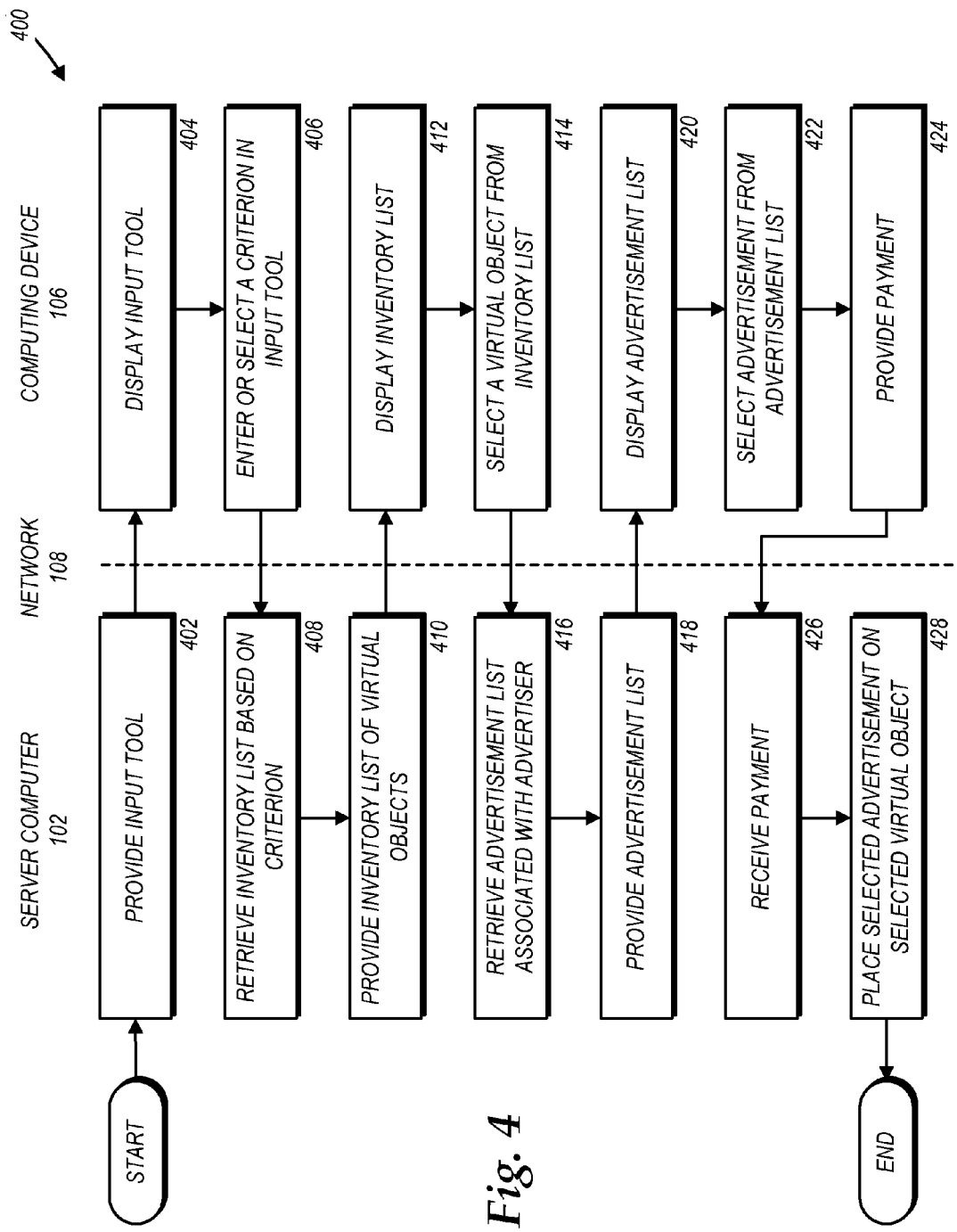
FIG. 4 is a flow diagram showing aspects of an illustrative process for providing an advertisement in a virtual world, in accordance with one embodiment.

Referring now to FIG. 4, additional details will be provided regarding the embodiments presented herein for providing advertising in a virtual world. In particular, FIG. 4 is a flow diagram illustrating aspects of one method provided herein for providing listings of virtual objects and advertisements and receiving a selection of virtual objects and advertisements. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

The routine 400 begins at operation 402, where the portal module 118 provides an input tool. For example, the input tool may include the inventory search interface 316. In one embodiment, the input tool enables the advertiser 302 to enter or select a criterion corresponding to the virtual objects the advertiser 302 desires to retrieve. In another embodiment, the input tool also enables the advertiser 302 to enter or select another criterion corresponding to the participants to whom the advertiser 302 desires to target. After the portal module 118 provides the input tool, the routine 400 continues to operation 404 where the portal access module 122 displays the input tool on, for example, the display 304. At operation 406, the advertiser 302 enters or selects one or more criteria in the inventory search interface 316. In one example, the advertiser 302 may enter a virtual town for retrieving virtual objects located in that virtual town. In another example, the advertiser 302 may enter a gender for retrieving participants associated with that gender. After the portal module 118 receives the criteria from the portal access module 122, the routine 400 continues to operation 408.

At operation 408, the portal module 118 retrieves from the inventory database 116 an inventory list, such as the inventory list 308, listing inventory satisfying the criteria. In one example, if the criteria specify a virtual town, the portal module 118 may retrieve an inventory list identifying all the virtual objects located in the virtual town. In another example, if the criteria also specify a gender, the portal module 118 may retrieve an inventory list identifying all the participants associated with the gender. At operation 410, the portal module 118 provides the inventory list 308 to the portal access module 122. After the portal access module 122 receives the inventory list 308 from the portal module 118, the routine 400 continues to operation 412 where the portal access module 122 displays the inventory list 308. At operation 414, the advertiser 302 selects one or more virtual objects from the inventory list 308. The advertiser 302 may also select one or more participants from the inventory list 308. In one example, the advertiser 302 may select the billboard 210 corresponding to the virtual object item 312 in the inventory list 308. In another example, the advertiser 302 may select a group of virtual objects, such as all the virtual objects in a virtual town. After the portal access module 122 provides the selected virtual objects to the portal module 118, the routine 400 continues to operation 416.

At operation 416, the portal module 118 retrieves an advertisement list, such as the advertisement list 310, listing advertisements in the advertisement database 114 that were uploaded by the advertiser 302. The routine 400 continues to operation 418 where the portal module 118 provides the advertisement list 310 to the portal access module 122. After the portal access module 122 receives the advertisement, the routine 400 continues to operation 420 where the portal access module 122 displays the advertisement list 310. At operation 422, the advertiser 302 selects one or more advertisements from the advertisement list 310. In one example, the advertiser 302 may select the root beer advertisement 214 corresponding to the advertisement item 314. In another example, the advertiser 302 may select a group of advertisements, such as all the video-based advertisements. The advertiser 302 may associate the selected advertisement or group of advertisement with particular participants. In this way, the advertiser 302 may direct particular advertisements to particular participants.

At operation 424, the advertiser 302 provides payment for the selected advertisements via the portal access module 122. The payment may be made by the advertiser 302 through, for example, the payment interface 322. At operation 426, the portal module 118 receives the payment from the portal access module 122. The routine 400 continues to operation 428 where the portal module 118 places the selected advertisements on the selected virtual objects. For example, as illustrated in FIG. 2, the root beer advertisement 214 may be placed on the billboard 210. If an avatar, such as the first avatar 206, comes across the billboard 210, the first participant 202 controlling the first avatar 206 may view the billboard 210 and be exposed to the root beer advertisement 214 or other advertisement intended to be directed to the first participant 202. As previously mentioned, the portal module 118 may place the selected advertisements on the selected virtual objects before, during, or after payment is made.

Figure 5:
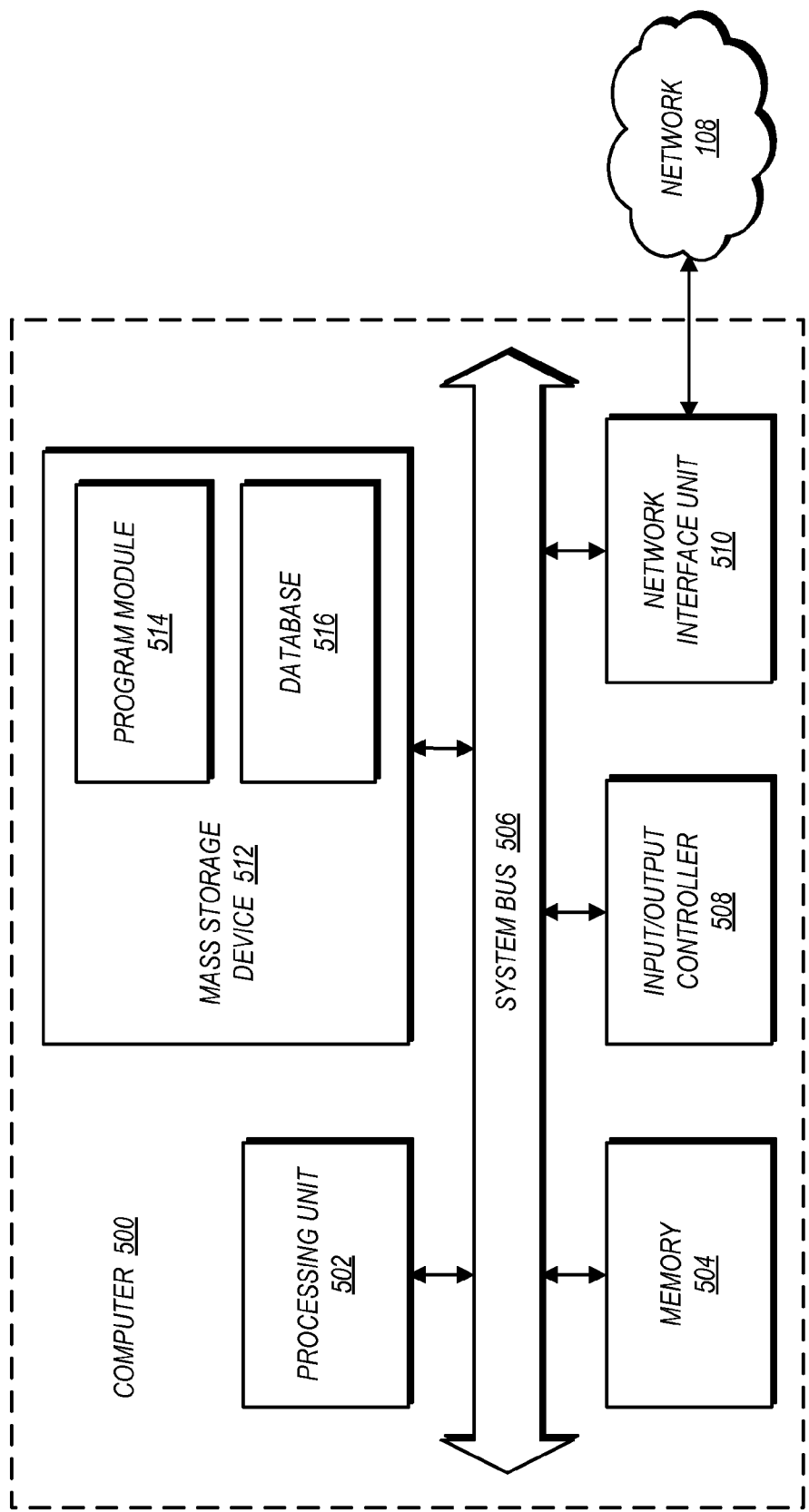
FIG. 5 is a computer architecture diagram showing aspects of an illustrative computer hardware architecture for a computing system capable of implementing aspects of the embodiments presented herein.

Referring now to FIG. 5, an exemplary computer architecture diagram showing aspects of a computer 500 is illustrated. Examples of the computer 500 may include the server computer 102, the client device 104, and the computing device 106. The computer 500 includes a processing unit 502 ("CPU"), a system memory 504, and a system bus 506 that couples the memory 504 to the CPU 502. The computer 500 further includes a mass storage device 512 for storing one or more program modules 514 and one or more databases 516. Examples of the program modules 514 may include the portal module 118, the virtual world client module 120, and the portal access module 122. Examples of the databases 516 may include the advertisement database 114 and the inventory database 116. The mass storage device 512 is connected to the CPU 502 through a mass storage controller (not shown) connected to the bus 506. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 108. The computer 500 may connect to the network 108 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

Based on the foregoing, it should be appreciated that technologies for providing advertising on virtual objects located in a virtual world are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing advertising in a virtual world, the computer-implemented method comprising computer-implemented operations for:
    providing, by a computer having a processor and a memory, an inventory list identifying a plurality of empty virtual objects that exist in the virtual world of a massively multiplayer online (MMO) application;
    receiving, by the computer, a selection of one or more empty virtual objects from the inventory list;
    upon receiving the selection of the one or more empty virtual objects from the inventory list, providing, by the computer, an advertisement list identifying a plurality of advertisements, the plurality of advertisements in the advertisement list being conditioned upon the one or more empty virtual objects that are selected from the inventory list such that the advertisement list excludes advertisements that the one or more empty virtual objects are incapable of displaying;
    receiving, by the computer, a selection of one or more advertisements from the advertisement list;
    upon receiving the selection of the one or more advertisements from the advertisement list, placing, by the computer, the one or more advertisements on the one or more empty virtual objects in the virtual world thereby transforming, the one or more empty virtual objects on which the one or more advertisements are not placed into one or more virtual objects on which the one or more advertisements are placed, wherein participants view the one or more advertisements by interacting with the one or more virtual objects in the virtual world via avatars controlled by the participants;
    wherein receiving a selection of one or more advertisements from the advertisement list comprises:
    receiving, by the computer, a first selection of one or more advertisements from the advertisement list;
    associating, by the computer, the first selection of one or more advertisements to a first set of participants;
    receiving, by the computer, a second selection of one or more advertisements from the advertisement list;
    associating, by the computer, the second selection of one or more advertisements to a second set of participants; and,
    wherein placing the selection of one or more advertisements on the selection of virtual objects in the virtual world comprises:
    placing, by the computer, the first selection of one or more advertisements on the selection of virtual objects when the first set of participants interact with the selection of virtual objects in the virtual world via a first set of avatars controlled by the first set of participants; and
    placing, by the computer, the second selection of one or more advertisements on the selection of virtual objects when the second set of participants interact with the selection of virtual objects in the virtual world via a second set of avatars controlled by the second set of participants.

2. The computer-implemented method of claim 1, further comprising computer-implemented operations for:
    providing, by the computer, an inventory search interface enabling an advertiser to enter or select an inventory search criterion;
    receiving, by the computer, the inventory search criterion from the advertiser; and
    generating, by the computer, the inventory list identifying empty virtual objects satisfying the inventory search criterion.

3. The computer-implemented method of claim 2, wherein the inventory search criterion comprises a location in the virtual world.

4. The computer-implemented method of claim 1, wherein receiving a selection of one or more virtual objects from the inventory list comprises receiving, by the computer, a category corresponding to a plurality of virtual objects from the inventory list.

5. The computer-implemented method of claim 1, further comprising generating, by the computer, the advertisement list with uploaded advertisements uploaded by an advertiser.

6. The computer-implemented method of claim 1, wherein receiving a selection of one or more advertisements from the advertisement list comprises receiving, by the computer, a category corresponding to a plurality of advertisements from the advertisement list.

7. The computer-implemented method of claim 1, further comprising:
   upon receiving the selection of one or more advertisements from the advertisement list, providing, by the computer, a payment interface; and
   receiving, by the computer, payment for the selection of one or more advertisements via the payment interface.

8. The computer-implemented method of claim 5, further comprising computer-implemented operations for:
   providing, by the computer, an advertisement upload interface enabling the advertiser to upload the uploaded advertisements;
   receiving, by the computer, the uploaded advertisements via the advertisement upload interface; and
   upon receiving the uploaded advertisements via the advertisement upload interface, populating, by the computer, the advertisement list with the uploaded advertisements.

9. The computer-implemented method of claim 1, wherein providing an advertisement list identifying a plurality of advertisements comprises:
   receiving, by the computer, a request to view the advertisement list;
   in response to receiving the request to view the advertisement list, providing, by the computer, an advertisement access interface requesting a login and a password;
   receiving, by the computer, the login and the password via the advertisement access interface;
   upon receiving the login and the password via the advertisement access interface, verifying, by the computer, whether the login and the password correspond to an authorized advertiser; and
   in response to verifying that the login and the password correspond to the authorized advertiser, transmitting, by the computer, the advertisement list.

10. A computer-implemented method for providing advertising in a virtual world, the computer-implemented method comprising computer-implemented operations for:
   providing, by a computer having a processor and a memory, an inventory search interface to enter or select an inventory search criterion;
   receiving, by the computer, the inventory search criterion;
   generating, by the computer, an inventory list identifying empty virtual objects satisfying the inventory search criterion, the empty virtual objects existing in the virtual world of a massively multiplayer online (MMO) application;
   providing, by the computer, the inventory list identifying the empty virtual objects satisfying the inventory search criterion;
   receiving, by the computer, a selection of one or more empty virtual objects from the inventory list;
   upon receiving the selection of the one or more empty virtual objects from the inventory list, providing, by the computer, an advertisement list identifying a plurality of advertiser-uploaded advertisements, the plurality of advertiser-uploaded advertisements in the advertisement list being conditioned upon the one or more virtual objects that are selected from the inventory list such that the advertisement list excludes advertisements that the one or more empty virtual objects are incapable of displaying;
   receiving, by the computer, a selection of one or more advertisements from the advertisement list;
   upon receiving the selection of the one or more advertisements from the advertisement list, placing, by the computer, the one or more advertisements on the one or more virtual objects in the virtual world, thereby transforming the one or more empty virtual objects on which the one or more advertisements are not placed into one or more virtual objects on which the one or more advertisements are placed, wherein participants view the one or more advertisements by interacting with the one or more virtual objects in the virtual world via avatars controlled by the participants;
   wherein receiving a selection of one or more advertisements from the advertisement list comprises:
   receiving, by the computer, a first selection of one or more advertisements from the advertisement list;
   associating, by the computer, the first selection of one or more advertisements to a first set of participants;
   receiving, by the computer, a second selection of one or more advertisements from the advertisement list;
   associating, by the computer, the second selection of one or more advertisements to a second set of participants; and,
   wherein placing the selection of one or more advertisements on the selection of virtual objects in the virtual world comprises:
   placing, by the computer, the first selection of one or more advertisements on the selection of virtual objects when the first set of participants interact with the selection of virtual objects in the virtual world via a first set of avatars controlled by the first set of participants; and
   placing, by the computer, the second selection of one or more advertisements on the selection of virtual objects when the second set of participants interact with the selection of virtual objects in the virtual world via a second set of avatars controlled by the second set of participants.

11. The computer-implemented method of claim 10, wherein the one or more virtual objects comprise a virtual object; wherein the one or more advertisements comprise a first advertisement and a second advertisement; wherein the avatars comprise a first avatar and a second avatar; wherein when the first avatar interacts with the virtual object, the first avatar views the first advertisement; and wherein when the second avatar interacts with the virtual object, the second avatar views the second advertisement.

* * * * *